(12) United States Patent
Smyers et al.

(10) Patent No.: US 6,292,844 B1
(45) Date of Patent: Sep. 18, 2001

(54) MEDIA STORAGE DEVICE WITH EMBEDDED DATA FILTER FOR DYNAMICALLY PROCESSING DATA DURING READ AND WRITE OPERATIONS

(75) Inventors: Scott Smyers, San Jose; Bruce Fairman, Woodside, both of CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/022,926

(22) Filed: Feb. 12, 1998

(51) Int. Cl.$^7$ ............................. G06F 13/00; G06F 13/14
(52) U.S. Cl. ................................. 710/5; 710/9; 710/22; 709/209; 370/232; 341/89
(58) Field of Search ............................. 341/89; 370/232; 395/500.44; 709/229; 710/5, 22, 8

(56) References Cited

U.S. PATENT DOCUMENTS

| | | | |
|---|---|---|---|
| 4,298,932 | 11/1981 | Sams | 711/202 |
| 4,410,983 | 10/1983 | Cope | 710/100 |
| 4,493,021 | 1/1985 | Agrawal et al. | 364/200 |

(List continued on next page.)

FOREIGN PATENT DOCUMENTS

| | | | |
|---|---|---|---|
| 0 428 111 A2 | 5/1991 | (EP) | G06F/13/28 |
| 0 499 394 A1 | 8/1992 | (EP) | G06F/13/38 |
| 0 588 046 A1 | 3/1994 | (EP) | G06F/13/38 |
| 0 696 853 A2 | 2/1996 | (EP) | H04B/1/20 |
| 5-165687 | 7/1993 | (JP) | G06F/12/00 |
| 409128156 | * 5/1997 | (JP) | . |

OTHER PUBLICATIONS

"The Parallel Protocol Engine" Matthias Kaiserswerth, IEEE/ACM Transactions on Networking, Dec. 1993, New York, pp. 650–663.

"The Programmable Protocol VLSI Engine (PROVE)" A.S. Krishnakumar, W.C. Fischer, and Krishan Sabnani, IEEE Transactions on Communications, Aug. 1994, New York, pp. 2630–2642.

"A Bus on a Diet–The Serial Bus Alternative" Michael Teener, CompCon92, Feb. 24–28, 1992, pp. 316–321.

(List continued on next page.)

*Primary Examiner*—Thomas Lee
*Assistant Examiner*—Tammara Peyton
(74) *Attorney, Agent, or Firm*—Haverstock & Owens LLP

(57) ABSTRACT

A media storage device includes an embedded filter for manipulating universal clock based streams of data as they are written to or read from the media storage device. The media storage device will also manipulate streams of data which are not being written to or read from the media storage device. Preferably the embedded filter within the media storage device is an isochronous data pipe which will receive programmed instructions from an external controller and manipulate streams of data according to the programmed instructions in real time, coordinated with the universal clock. Alternatively, the isochronous data pipe includes fixed firmware for performing the appropriate manipulations. The media storage device is also preferably coupled to an IEEE 1394-1995 serial bus structure. As streams of data are received by the media storage device during a write operation, those streams of data can be manipulated into a different format by the embedded filter before they are stored on the media within the media storage device. As streams of data are being transmitted from the media storage device during a read operation, those streams of data can be manipulated into a different format by the embedded filter before they are transmitted onto the IEEE 1394-1995 serial bus structure. In both instances, the universal clock can be used to synchronize the data streams. The media storage device will also utilize the embedded filter to manipulate streams of data being transmitted between two other devices on the IEEE 1394-1995 serial bus structure.

26 Claims, 5 Drawing Sheets

U.S. PATENT DOCUMENTS

| | | | |
|---|---|---|---|
| 4,972,470 * | 11/1990 | Farago | 713/192 |
| 4,998,245 | 3/1991 | Tanaka et al. | 370/85.1 |
| 5,008,819 | 4/1991 | Gorbatenko | 711/116 |
| 5,233,683 * | 8/1993 | Sasaki | 358/1.11 |
| 5,313,617 * | 5/1994 | Nakano et al. | 703/24 |
| 5,359,713 | 10/1994 | Moran et al. | 395/200 |
| 5,369,773 | 11/1994 | Hammerstrom | 395/800 |
| 5,432,650 | 7/1995 | Nunomura et al. | 360/27 |
| 5,473,362 | 12/1995 | Fitzgerald et al. | 348/7 |
| 5,506,846 | 4/1996 | Edem et al. | 370/94.2 |
| 5,509,126 | 4/1996 | Oprescu et al. | 395/307 |
| 5,535,208 | 7/1996 | Kawakami et al. | 370/84 |
| 5,544,324 | 8/1996 | Edem et al. | 395/200.17 |
| 5,548,587 | 8/1996 | Bailey et al. | 370/60.1 |
| 5,550,802 | 8/1996 | Worsley et al. | 370/13 |
| 5,559,796 | 9/1996 | Edem et al. | 370/60 |
| 5,559,967 | 9/1996 | Oprescu et al. | 395/285 |
| 5,586,264 | 12/1996 | Belknap et al. | 395/200.08 |
| 5,594,734 | 1/1997 | Worsley et al. | 370/395 |
| 5,602,853 | 2/1997 | Ben-Michael et al. | 380/474 |
| 5,603,058 | 2/1997 | Belknap et al. | 395/855 |
| 5,615,382 | 3/1997 | Gavin et al. | 395/800 |
| 5,617,419 | 4/1997 | Christensen et al. | 370/471 |
| 5,640,392 | 6/1997 | Hayashi | 370/395 |
| 5,640,592 * | 6/1997 | Rao | 710/5 |
| 5,647,057 | 7/1997 | Roden et al. | 395/275 |
| 5,652,584 * | 7/1997 | Yoon | 341/89 |
| 5,659,780 | 8/1997 | Wu | 395/800.19 |
| 5,664,124 | 9/1997 | Katz et al. | 395/309 |
| 5,671,441 | 9/1997 | Glassen et al. | 710/8 |
| 5,687,174 | 11/1997 | Edem et al. | 370/446 |
| 5,689,678 | 11/1997 | Stallmo et al. | 711/114 |
| 5,692,211 | 11/1997 | Gulick et al. | 395/800 |
| 5,699,503 | 12/1997 | Bolosky et al. | 714/6 |
| 5,704,052 | 12/1997 | Wu et al. | 395/380 |
| 5,761,430 | 6/1998 | Gross et al. | 709/225 |
| 5,764,972 | 6/1998 | Crouse et al. | 709/1 |
| 5,781,599 | 7/1998 | Shiga | 375/376 |
| 5,781,615 | 7/1998 | Bales et al. | 379/88.18 |
| 5,790,886 | 8/1998 | Allen | 710/5 |
| 5,812,883 * | 9/1998 | Rao | 710/74 |
| 5,815,678 | 9/1998 | Hoffman et al. | 395/309 |
| 5,835,694 | 11/1998 | Hodges | 714/6 |
| 5,835,726 * | 11/1998 | Shwed et al. | 709/229 |
| 5,884,103 * | 3/1999 | Terho et al. | 710/22 |
| 5,887,145 * | 3/1999 | Harrari et al. | 710/102 |
| 5,893,148 | 4/1999 | Genduso et al. | 711/132 |
| 5,928,331 | 7/1999 | Bushmitch | 709/231 |
| 5,946,298 * | 8/1999 | Okuyama | 370/232 |
| 5,960,036 | 9/1999 | Johnson et al. | 375/219 |
| 5,970,236 * | 10/1999 | Galloway et al. | 395/500.44 |
| 5,987,126 | 11/1999 | Okuyama et al. | 380/203 |
| 5,991,520 | 11/1999 | Smyers et al. | 710/100 |
| 6,064,676 | 5/2000 | Slattery et al. | 370/412 |
| 6,085,270 | 7/2000 | Gutlick | 710/100 |

OTHER PUBLICATIONS

"Local Area Network Protocol for Autonomous Control of Attached Devices" Software Patent Institute, 1995, 1996.

"Architecture for High Performance Transparent Bridges" Software Patent Institute, 1995, 1996.

"Access to High–Speed LAN via Wireless Media" Software Patent Institute, 1995, 1996.

"Asynchronous Transfer Mode" Julia L. Heeter, Dec. 12, 1995.

"The SerialSoft IEEE 1394 Developer Tool" Skipstone.

"Data link driver program design for the IBM token ring network PC adapter" Gee–Swee Poo and Wilson Ang, Computer Communications, 1989, London, Great Britain, pp. 266–272.

"Fiber Channel (FCS)/ATM interworking: A design solution" A. Anzaloni, M. De Sanctis, F. Avaltroni, G. Rulli, L. Proietti and G. Lombardi, Ericsson Fatme R&D Division, Nov. 1993, pp. 1127–1133.

"Data Exchange Adapter for Micro Channel/370" Software Patent Institute, 1995, 1996.

American National Standards Institute X3T10 Technical Committee, Information Technology—Serial Bus Protcol (SBP–2), Project 1155D, Revision 1e, Nov. 9, 1996.

IEEE, "1394 Standard for a High Performance Serial Bus," 1995, USA.

* cited by examiner

IDP REGISTER FILE

| Name | Reg Code | width | src/dest? | Register Usage |
|---|---|---|---|---|
| TMM | 0 | 34 | src | Immediate Value |
| BUS_IN | 1 | 32 | src | receive FIFO |
| BUS_OUT | 2 | 34 | dest | outbound isochronous FIFO |
| | 3 | | | |
| D0 | 4 | 34 | src/dest | Data Register 0 |
| D1 | 5 | 34 | src/dest | Data Register 1 |
| D2 | 6 | 34 | src/dest | Data Register 2 |
| D3 | 7 | 34 | src/dest | Data Register 3 |
| D4 | 8 | 34 | src/dest | Data Register 4 |
| D5 | 9 | 34 | src/dest | Data Register 5 |
| D6 | A | 34 | src/dest | Data Register 6 |
| D7 | B | 34 | src/dest | Data Register 7 |
| | C | | | |
| | D | | | |
| | E | | | |
| | F | | | |
| DATA_0 | 10 | 32 | src/dest | data interface DMA channel 0 |
| DATA_1 | 11 | 32 | src/dest | data interface DMA channel 1 |
| DATA_2 | 12 | 32 | src/dest | data interface DMA channel 2 |
| DATA_3 | 13 | 32 | src/dest | data interface DMA channel 3 |
| | 14 | | | |
| | 15 | | | |
| | 16 | | | |
| | 17 | | | |
| | 18 | | | |
| | 19 | | | |
| | 1A | | | |
| | 1B | | | |
| | 1C | | | |
| | 1D | | | |
| | 1E | | | |
| | 1F | | | |

Fig. 5

MEDIA STORAGE DEVICE WITH EMBEDDED DATA FILTER FOR DYNAMICALLY PROCESSING DATA DURING READ AND WRITE OPERATIONS

FIELD OF THE INVENTION

The present invention relates to the field of writing data to and reading data from a media storage device. More particularly, the present invention relates to the field of manipulating the data read from or written to a media storage device.

BACKGROUND OF THE INVENTION

The IEEE 1394-1995 standard, "1394 Standard For A High Performance Serial Bus," is an international standard for implementing an inexpensive high-speed serial bus architecture which supports both asynchronous and isochronous format data transfers. In addition, the IEEE 1394-1995 bus has a universal clock called the cycle timer. This clock is synchronized on all nodes. Isochronous data transfers are real-time transfers which take place based on the universal clock such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394-1995 standard bus architecture provides multiple independent channels for isochronous data transfer between applications. A six bit channel number is broadcast with the data to ensure reception by the appropriate application. This allows multiple applications to simultaneously transmit isochronous data across the bus structure. Asynchronous transfers are traditional reliable data transfer operations which take place as soon as arbitration is won and transfer a maximum amount of data from a source to a destination.

The IEEE 1394-1995 standard provides a high-speed serial bus for interconnecting digital devices thereby providing a universal I/O connection. The IEEE 1394-1995 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394-1995 standard is very thin in size compared to other bulkier cables used to connect such devices in other connection schemes. Devices can be added and removed from an IEEE 1394-1995 bus while the bus is operational. If a device is so added or removed the bus will then automatically reconfigure itself for transmitting data between the then existing nodes. A node is considered a logical entity with a unique address on the bus structure. Each node provides in a standard address space, an identification ROM, a standardized set of control registers and in addition, its own address space.

The IEEE 1394-1995 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device and the IEEE 1394-1995 cable. The physical layer 16 also provides arbitration to ensure that all devices coupled to the IEEE 1394-1995 bus have arbitrated access to the bus as well as actual data transmission and reception. The link layer 14 provides data packet delivery service for both asynchronous and isochronous data packet transport. This supports both asynchronous data transport, using an acknowledgement protocol, and isochronous data transport, providing an un-acknowledged real-time guaranteed bandwidth protocol for just-in-time data delivery. The transaction layer 12 supports the commands necessary to complete asynchronous data transfers, including read, write and lock. The serial bus management block 10 contains an isochronous resource manager for managing isochronous data transfers. The serial bus management block 10 also provides overall configuration control of the serial bus in the form of optimizing arbitration timing, guarantee of adequate electrical power for all devices on the bus, assignment of the cycle master, assignment of isochronous channel and bandwidth resources and basic notification of errors.

A hard disk drive including an IEEE 1394-1995 serial bus interface is illustrated in FIG. 2. The hard disk drive 20 includes the IEEE 1394-1995 serial bus interface circuit 22 for interfacing to an IEEE 1394-1995 serial bus network. The interface circuit 22 is coupled to a buffer controller 24. The buffer controller 24 is coupled to a random access memory (RAM) 26 and to a read/write channel circuit 28. The read/write channel circuit 28 is coupled to the media 30 on which data is stored within the hard disk drive 20. The read/write channel circuit 28 controls the storage operations on the media 30, including reading data from the media 30 and writing data to the media 30.

During a write operation to the hard disk drive 20, a stream of data is received from a device coupled to the IEEE 1394-1995 serial bus structure by the IEEE 1394-1995 interface circuit 22. This stream of data is forwarded from the IEEE 1394-1995 interface circuit 22 to the buffer controller 24. The buffer controller 24 then stores this data temporarily in a buffer in the RAM 26. When the read/write channel circuit 28 is available, the buffer controller 24 reads the data from the RAM 26 and forwards it to the read/write channel circuit 28. The read/write channel circuit 28 then writes the data onto the media 30.

During a read operation from the hard disk drive 20, a stream of data is read from the media 30 by the read/write channel circuit 28. This stream of data is forwarded by the read/write channel circuit 28 to the buffer controller 24. The buffer controller 24 then stores this data temporarily in a buffer in the RAM 26. When the IEEE 1394-1995 serial bus interface circuit 22 is available, the buffer controller 24 reads the data from the RAM 26 and forwards it to the interface circuit 22. The IEEE 1394-1995 serial bus interface circuit 22 then formats the data according to the requirements of the IEEE 1394-1995 standard and transmits this data to the appropriate device or devices over the IEEE 1394-1995 serial bus.

A traditional hard disk drive 20, as described, records data and plays it back according to commands received from an external controller using a protocol such as the serial bus protocol (SBP). The external controller provides command data structures to the hard disk drive 20 which inform the hard disk drive 20 where on the media 30 the data is to be written, in the case of a write operation, or read from, in the case of a read operation. The function of the hard disk drive 20 during a read operation is to recreate the original, unmodified stream of data which was previously written on the media 30.

With the growing use of the IEEE 1394-1995 serial bus, personal computers are now being coupled together in IEEE 1394-1995 networks with devices which have not traditionally been coupled to personal computers. Examples of such devices are consumer electronic devices such as video cassette recorders, video camcorders, digital video disk players and compact disk players. Raw data from these consumer devices is not always directly usable by a personal computer. The typical solution to this problem is to write an application software program which will run on the personal computer and perform the necessary data manipulation to transform the data into a format which is useful to other applications being run by the personal computer.

What is needed is a filtering device which can be used to manipulate the data from a consumer device into a format required by a personal computer or other device. What is further needed is a filtering device which can also manipulate the data from a personal computer device into a format required by a consumer electronic device.

SUMMARY OF THE INVENTION

A media storage device includes an embedded filter for manipulating universal clock based streams of data as they are written to or read from the media storage device. The media storage device will also manipulate streams of data which are not being written to or read from the media storage device. Preferably the embedded filter within the media storage device is an isochronous data pipe which will receive programmed instructions from an external controller and manipulate streams of data according to the programmed instructions in real time, coordinated with the universal clock. Alternatively, the isochronous data pipe includes fixed firmware for performing the appropriate manipulations. The media storage device is also preferably coupled to an IEEE 1394-1995 serial bus structure. As streams of data are received by the media storage device during a write operation, those streams of data can be manipulated into a different format by the embedded filter before they are stored on the media within the media storage device. As streams of data are being transmitted from the media storage device during a read operation, those streams of data can be manipulated into a different format by the embedded filter before they are transmitted onto the IEEE 1394-1995 serial bus structure. In both instances, the universal clock can be used to synchronize the data streams. The media storage device will also utilize the embedded filter to manipulate streams of data being transmitted between two other devices on the IEEE 1394-1995 serial bus structure.

BRIEF DESCRIPTION OF THE DRAWINGS

FIG. 5 illustrates a register file within the isochronous data pipe sequencer.

DETAILED DESCRIPTION OF THE PREFERRED EMBODIMENT

A media storage device of the present invention includes an embedded data filter for filtering data as it is either written to the media storage device or read from the media storage device. Preferably, this embedded data filter is an isochronous data pipe which is programmable and will manipulate streams of data and the universal clock into the proper format. The isochronous data pipe is preferably programmed for the appropriate manipulations by an external controller which is controlling the media storage device. Alternatively, the isochronous data pipe includes fixed firmware for performing the appropriate manipulations.

The media storage device with the embedded filter of the present invention takes advantage of the central role of the media storage device in the communication of data between consumer electronic devices and a personal computer within an IEEE 1394-1995 serial bus network. The embedded filter within the media storage device adds the ability to filter data inside the media storage device as it is being written to the media storage device or read from the media storage device. The media storage device with embedded filter can also be used to filter a stream of data, even if the data is not being written to or read from the media storage device.

Within the media storage device, the embedded filter will manipulate a stream of data into a proper format for the device to which the data is directed, under the control of the external controlling device. As an example, when storing communications from a consumer device which are to be used by a personal computer, the embedded filter within the media storage device will manipulate those communications from the received format into a proper format for the personal computer. When the communications are read by the personal computer from the media storage device, the communications will then be in the proper format for the personal computer. The personal computer will not have to perform any further manipulation of the communications in order to utilize them as necessary. If necessary, the communications can also be manipulated a second time by the embedded filter when they are read from the media storage device by the personal computer. In the same manner, communications from the personal computer to a consumer device can be manipulated into the proper format for the consumer device by the embedded filter.

Figure 1:
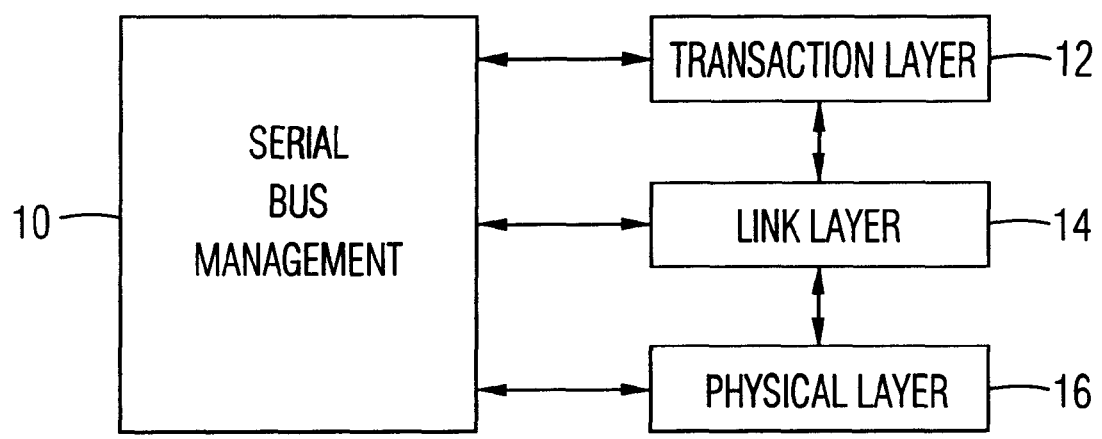
FIG. 1 illustrates a protocol stack defined by the IEEE 1394-1995 standard.
Figure 2:
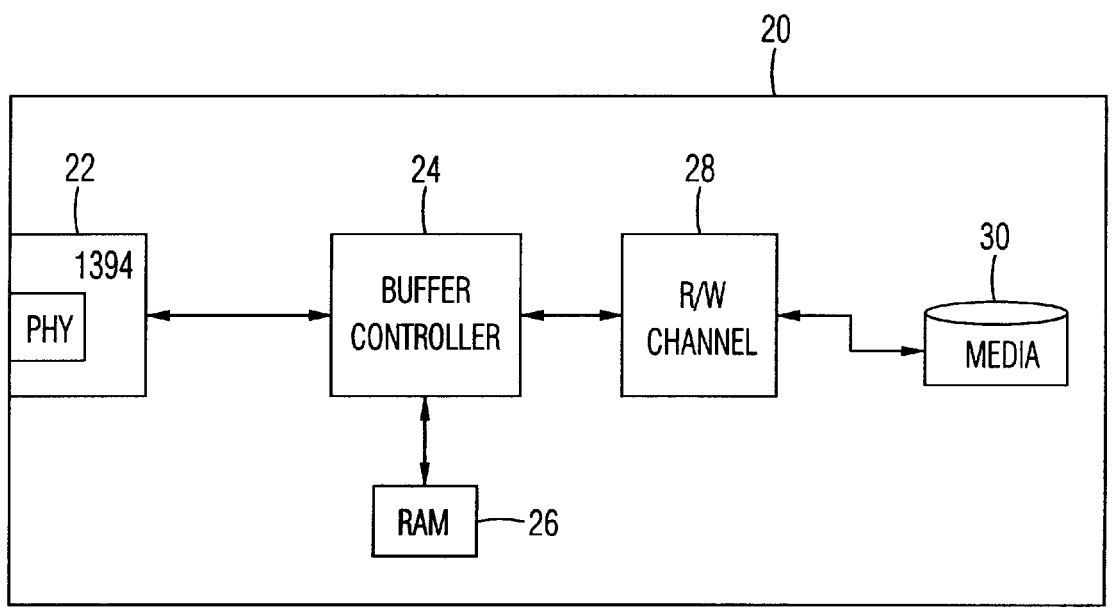
FIG. 2 illustrates a block diagram of a media storage device of the prior art.
Figure 3:
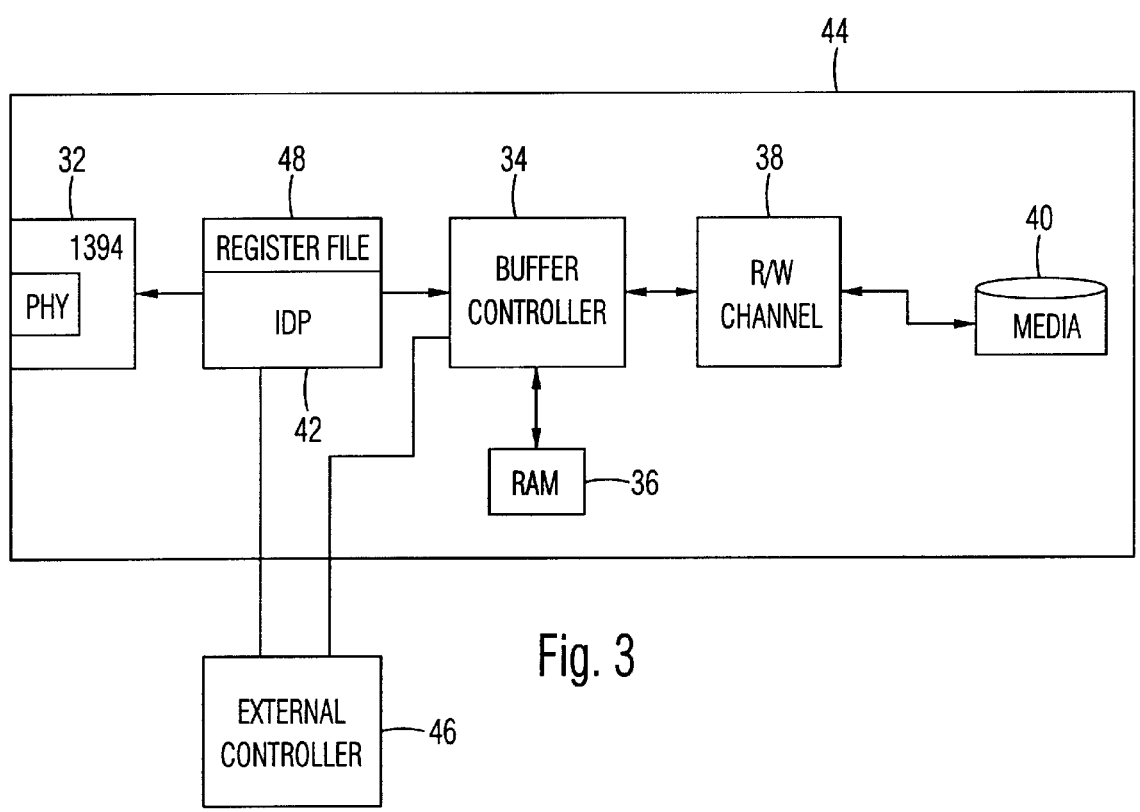
FIG. 3 illustrates a block diagram of a media storage device according to the present invention.

A media storage device according to the present invention is illustrated in FIG. 3. The media storage device 44 includes an IEEE 1394-1995 serial bus interface circuit 32 for sending communications to and receiving communications from other devices coupled to the IEEE 1394-1995 serial bus network. The interface circuit 32 is coupled to an embedded filter 42. Preferably, the embedded filter 42 is an isochronous data pipe. The embedded filter 42 is coupled to a buffer controller 34. The buffer controller 34 is also coupled to a RAM 36 and to a read/write channel circuit 38. The read/write channel circuit 38 is coupled to media 40 on which data is stored within the media storage device 44. The read/write channel circuit 38 controls the storage operations on the media 40, including reading data from the media 40 and writing data to the media 40. An external controller 46 is coupled to the embedded filter 42 for controlling the manipulation of data streams and to the buffer controller 34 for controlling read and write operations to the media 40.

During a write operation to the media storage device 44, the IEEE 1394-1995 serial bus interface circuit 32 receives a stream of data from the IEEE 1394-1995 serial bus. The interface circuit 32 then forwards this data to the embedded filter 42. The embedded filter 42 modifies the data, byte by byte, as specified by the programmed instructions from the external controller 46, and forwards the modified data to the buffer controller 34. The buffer controller 34 then stores this modified data temporarily in a buffer in the RAM 36. When the read/write channel circuit 38 is available, the buffer controller 34 reads the data from the RAM 36 and forwards it to the read/write channel circuit 38. The read/write channel circuit 38 then writes the data onto the media 40. Because the embedded filter 42 is programmable, the data can be manipulated during a write operation, during a read operation or during both write and read operations.

During a read operation from the media storage device 44, a stream of data is read from the media 40 by the read/write channel circuit 38. This stream of data is forwarded by the read/write channel circuit 38 to the buffer controller 34. The buffer controller 34 then stores this data temporarily in a circular buffer in the RAM 36. When the IEEE 1394-1995 serial bus interface circuit 32 is available, the buffer controller 34 reads the data from the RAM 36 and forwards it to the embedded filter 42. If the embedded filter 42 is programmed to manipulate the data stream during a read operation, this manipulation is performed and the data is forwarded to the IEEE 1394-1995 serial bus interface circuit 32. The IEEE 1394-1995 serial bus interface circuit 32 then formats the data according to the requirements of the IEEE 1394-1995 standard and transmits this data to the appropriate device or devices over the IEEE 1394-1995 serial bus.

The embedded filter 42 within the media storage device 44 of the present invention can be used to manipulate a stream of data being written to or read from the media 40. The embedded filter 42 can also be used to manipulate a stream of data being transmitted between two devices on the IEEE 1394-1995 serial bus which is not being written to or read from the media 40. During such an operation, the stream of data is received by the interface circuit 32 and forwarded to the embedded filter 42. The embedded filter 42 then manipulates this data according to a preprogrammed function and forwards the data to the buffer controller 34. The buffer controller 34 then temporarily stores the data within a circular buffer within the RAM 36. The buffer controller 34 then reads this data from the RAM 36 and forwards it to the embedded filter 42. If the embedded filter 42 is also programmed to manipulate the data stream before it is retransmitted, then this manipulation is performed and the data is forwarded to the IEEE 1394-1995 serial bus interface circuit 32. The interface circuit 32 then retransmits the manipulated data onto the IEEE 1394-1995 serial bus structure.

The embedded filter 42 is preferably programmed by the external controller 46 to manipulate streams of data received by or to be transmitted by the media storage device 44. Alternatively, the embedded filter 42 includes fixed firmware for performing the appropriate manipulations. The embedded filter 42 can be programmed to manipulate streams of data on the way into the media storage device and on the way out of the media storage device. As an example of the utilization of the embedded filter 42 within an IEEE 1394-1995 serial bus network, streams of data being written to the media storage device from any device on the network can all be formatted into a first format when they are stored on the media 40. Then when data is read from the media 40 for transmission to a particular device, that data can be manipulated by the embedded filter 42 into an appropriate format for the particular device. Additionally, the embedded filter 42 can be used in special cases to manipulate streams of data from a first device to a second device on the IEEE 1394-1995 serial bus structure.

As described above, the embedded filter 42 is preferably an isochronous data pipe. A preferred embodiment of the isochronous data pipe 42 is taught in U.S. patent application Ser. No. 08/612,322, filed on Mar. 7, 1996 and entitled "ISOCHRONOUS DATA PIPE FOR MANAGING AND MANIPULATING A HIGH-SPEED STREAM OF ISOCHRONOUS DATA FLOWING BETWEEN AN APPLICATION AND A BUS STRUCTURE," which is hereby incorporated by reference. The isochronous data pipe 42 is programmable and will execute a series of instructions on a stream of data in order to perform manipulations on the data as required to place the data in the appropriate format. The isochronous data pipe 42 can be programmed to manipulate both asynchronous and isochronous data.

For each quadlet of data transferred, the isochronous data pipe 42 executes a predetermined number of instructions to manipulate the data as necessary from the received format into the receiving format. When converting data, the isochronous data pipe 42 operates on each quadlet of data independently. The isochronous data pipe 42 performs a programmable number of instructions on each quadlet in order to manipulate the data, as necessary. The isochronous data pipe 42 also includes an independent, dedicated register file 48.

Figure 4:
FIG. 4 illustrates a register file within the isochronous data pipe.

The isochronous data pipe 42 is controlled by an independent, dedicated register file, as illustrated in FIG. 4. This register file is programmed by the external controller 46 and used to manipulate the data flowing through the isochronous data pipe 42, as necessary. The register file 180 preferably includes 120 bytes of data, numbered hexadecimally 0 through 77. In FIG. 4, the register file 180 is illustrated in a table format with 30 horizontal rows, each including four bytes of data. An offset column 182 is included in FIG. 4, to show the offset of the beginning byte in each row from the address of the beginning of the register file 180. A read/write column 184 is also included to show whether the fields in each row can be either read from and written to or read from only.

The cycle time field cycle_time is a twenty bit field within bytes 0–2 of the register file 180. The cycle time field can be read from and written to. When the control event field, which will be discussed below, contains the cycle number value, the cycle time field holds the cycle time on which the channel mask field will be loaded from the pending channel mask field as described below.

The control field is a thirty-two bit field within bytes 4–7 of the register file 180. The control field can be read from and written to. The control field includes an event field, an output enable field, a stop on error field, a transmit enable field and a go field. The event field is a four bit field in bits 28–31 of the control register. The value in the event field defines the bus event for the isochronous data pipe 42 to use as a trigger. When this bus event occurs, the isochronous data pipe 42 transfers the value stored in the pending channel mask register pending_ch_mask to the current channel mask register ch_mask. The event field is encoded for the possible bus events as illustrated in Table I below.

TABLE I

| value | meaning |
|---|---|
| 0 | immediately |
| 1 | cycle number |
| 2 | reserved |
| 3 | reserved |
| 4-F | reserved |

Therefore, when a value equal to 0 is written to the event field by an external controller the isochronous data pipe will then immediately transfer the value in the channels pending register to the channel mask register. When the event field holds a value equal to 1, the isochronous data pipe transfers the value in the channels pending register to the channel mask register on the programmed cycle time, as described above.

The output enable field is a four bit field in bits 4–7 of the control field. When any of the bits in the output enable field are set to a logical high value, then the corresponding DMA channel will assure that the appropriate path is kept full.

The stop on error field is a one bit field in bit 3 of the control field. When the stop on error bit is set to a logical high value, the isochronous data pipe 42 will stop the current operation on the first error encountered by setting the value in the channel mask register to a logical low value. Possible errors when sending data include a data underrun or a missing cycle start packet. Possible errors when receiving data include a data overrun, a missing cycle start packet, a data CRC error, an error in packet format or a channel missing error.

The transmit enable field is a one bit field in bit 1 of the control field. When the transmit enable bit is set to a logical high value, the isochronous data pipe 42 will begin executing the output control store program. When the go bit is at a logical low value or the output control store program executes a return instruction, the transmit enable bit will be cleared.

The go field is a one bit field in bit 0 of the control field. The application sets the go bit to a logical high value to enable the isochronous data pipe to watch for an event. When the specified event condition is satisfied, the isochronous data pipe 42 transfers the contents of the pending channel mask register to the current channel mask register.

The status field is a thirty-two bit field within bytes 8-B of the register file 180. The status field can be read from and written to. The status field contains status information which reports the current state of the isochronous data pipe 42. The bits 0–7 of the status field correspond to the bits 0–7 of the control field and include an output field, a stop on error field, a transmit enable field and an active field. The value of these fields in the status register indicate the current operational state of the isochronous data pipe 42. The bits 8–27 of the status field are reserved. Within the status field, the active field is a one bit field in bit 0 of the status field, which indicates whether or not the isochronous data pipe is active. Preferably, if the active bit is equal to a logical high value, the isochronous data pipe is currently active and transferring data. If the active bit is equal to a logical low value, the isochronous data pipe is not currently active. The error field is a four bit field in bits 28–31 of the status field. When the isochronous data pipe 42 halts operation due to an error, the error field contains a value indicating the error condition. The error field is only valid when the active bit is equal to a logical low value. The possible values for the error field and the errors to which they correspond are listed in Table II below.

TABLE II

| Value | Error |
|---|---|
| 0 | Data |
| 1 | Data underrun |
| 2 | Missing cycle start packet |
| 3 | Data CRC error |
| 4 | Error in packet format |

The pending channel mask high field pending_ch_mask_hi is a four byte field within bytes 20–23 of the register file 180. The pending channel mask low field pending_ch_mask_lo is a four byte field within bytes 24–27 of the register file 180. Together, the two pending channel mask fields pending_ch_mask_hi and pending_ch_mask_lo form an eight byte field containing the mask of isochronous channel numbers for the isochronous data pipe 42 to receive. The isochronous data pipe 42 transfers the contents of this field to the channel mask register when the programmed trigger event occurs. The bit assignment of the pending channel mask field is the same as the bit assignment of the channels available register defined in chapter eight of the IEEE 1394-1995 standard.

The current channel mask high field ch_mask_hi is a four byte field within bytes 28–2B of the register file 180. The current channel mask low field ch_mask_lo is a four byte field within bytes 2C–2F of the register file 180. Together, the two current channel mask fields ch_mask_hi and ch_mask_lo form an eight byte field containing the channel mask currently in operation, with each bit within the current channel mask fields representing an isochronous channel. The channel mask field is only loaded from the pending channel mask field when a trigger event occurs. The isochronous data pipe 42 ignores received isochronous channel numbers for which the corresponding bit in the current channel mask field is set to a logical low value.

The control store output field CS_output is a one byte field within byte 34 of the register file 180. The control store output field CS_output contains the control store address within the control store memory, to which the isochronous data pipe 42 dispatches when transmitting is enabled. The control store memory contains instructions used by the isochronous data pipe in performing its operations on a stream of data.

The control store cycle start address field CS_addr_CS is a one byte field within byte 37 of the register file 180. The control store address field CS_addr_CS contains the control store address to which the isochronous data pipe branches when the cycle start packet is received. The first quadlet available to the control store program is the first quadlet of the cycle start packet. The control store address fields CS_addr_0 through CS_addr_63 are each one byte fields within bytes 38 through 77 of the register file 180. These fields contain the control store address store where the isochronous data pipe is to branch upon receiving data on the isochronous channel matching the byte number of the control store address field. For example, the control store address field CS_addr_10 contains the address in the control store where the isochronous data pipe is to branch upon receiving data on the isochronous channel number 10. The isochronous data pipe ignores all isochronous channels for which the corresponding value in the control store address field is equal to FFh. After dispatching to a control store address specified within either the control store cycle start address field CS_addr_CS or one of the control store address fields CS_addr_0 through CS_addr_63, the isochronous data pipe executes from that control store address until it encounters a return instruction. When the isochronous data pipe encounters a return instruction, the isochronous data pipe either returns to the idle state if transmitting was not previously enabled, or it returns to the location in the transmit control store program where it was prior to the dispatch.

There are sixty-four potential isochronous channels 0–63. The control store address fields CS_addr_0 through CS_addr_63 each correspond to an isochronous channel and contain the address in the control store memory where the instructions for that isochronous channel begin. Accordingly, when the isochronous data pipe 42 receives data on a particular isochronous channel, the isochronous data pipe 42 branches to the address contained in the corresponding control store address field to obtain the instructions for manipulating the data for that channel. Isochronous channels for which the corresponding value in the control store address field is equal to FFh are ignored, as are channels corresponding to bits in the current channel mask register which are equal to zero.

A stream of isochronous data is made up of one or more isochronous channels. The isochronous data pipe 42 receives isochronous channels for which the corresponding bit in the current channel mask field is set to a logical high value. The isochronous data pipe 42 transmits isochronous data according to the control store program beginning at the control store address pointed to by the value in the control store output CS_output register.

The isochronous data pipe 42 is actually a programmable sequencer which can be programmed to perform operations on the received stream of data. The isochronous data pipe sequencer contains a register file as illustrated in FIG. 5. Within the register file 190, the immediate value register IMM is a thirty-four bit register with a register code of "0" which can only be a source register. The immediate value register IMM specifies that the thirty-four bit immediate field of the instruction contains the source data for the given operation.

The bus input register BUS_IN is a thirty-two bit register with a register code of "1" which can only be a source register. Accessing the bus input register BUS_IN as a source of an operation clocks one quadlet of data through the isochronous data pipe 42. Subsequent accesses to the bus input register BUS_IN access subsequent quadlets of data in the input data stream.

The bus output register BUS_OUT is a thirty-four bit register with a register code of "2" which can only be a destination register. Accessing the bus output register BUS_OUT as a destination of an operation clocks one quadlet of data through the isochronous data pipe 42. Subsequent accesses to the bus output register BUS_OUT clock subsequent quadlets of data in the output data stream.

The data registers D0–D7 are each thirty-four bit registers with a register code of "4", "5", "6", "7", "8", "9", "A" and "B", respectively, which can be either a source or destination register. The data registers D0–D7 can be used as the source or destination register for any operation.

The data interface registers DATA_0–DATA_3 are each thirty-two bit registers with a register code of "10", "11", "12" and "13", respectively, which can be either a source or destination register. Each of the data interface registers DATA_0–DATA_3 access a different DMA channel. Use of these registers is to be consistent with the programming of the output enable field DMA_out_en.

The isochronous data pipe 42 implements a stack made up of a linear list of eight one byte registers. The stack registers are only accessed during a branch to subroutine instruction and a return instruction. In the preferred embodiment of the present invention, the stack registers S0–S7, each have a respective register address 0–7. Alternatively, the actual number of stack registers will vary depending on the specific implementation. When the control store program is loaded, the stack pointer is automatically initialized to a value of zero, thereby pointing to the corresponding stack register S0.

When the isochronous data pipe 42 branches to a subroutine, the isochronous data pipe 42 stores the address of the next control store instruction into the current stack register, increments the value of the stack pointer, then branches to the control store instruction contained in the low order byte of the source field. When the isochronous data pipe 42 executes a return instruction, it decrements the stack pointer, then branches to the control store instruction contained in the current stack register. If the stack pointer is decremented when it contains a value equal to zero, the value of the stack pointer will remain at zero and the isochronous data pipe 42 will halt operation until it receives an isochronous data packet or cycle start packet. When the isochronous data pipe is executing an output control store program and a cycle start packet or enabled isochronous channel is received, the isochronous data pipe 42 will interrupt execution of the output control store program, save the address of the current instruction in the stack, decrement the stack pointer and then dispatch to the proper location to handle the received packet.

Each isochronous control store instruction includes an OpCode field, a source field, a destination field, an immediate value field, an immediate field and a reserved field. The OpCode field is a six bit field which describes an operation to perform. The source field src is a four bit field which specifies a register or immediate value which contains the source value for the specified operation. The destination field dest is a four bit field which specifies a destination register for the specified operation. The immediate value field imm_val is a one bit field which when set to a logical high value, specifies that one of the operands is contained in the immediate field. The immediate field imm is a thirty-four bit field which specifies an immediate value to use for an operation if the immediate value field imm_val is set to a logical high value. In the preferred embodiment of the present invention, the reserved field includes thirteen bits which are reserved for use in alternate embodiments of the isochronous data pipe 20.

The operation codes which are implemented by the preferred embodiment of the isochronous data pipe sequencer during manipulation of a data stream and can be included in the OpCode field are listed in Table III below. The isochronous data pipe 42 will store the results for any of these operations into any register which is capable of being a destination, as illustrated in FIG. 5, including the data registers D0–D7 and any DMA channel which is configured as a destination.

TABLE III

| Name | Mnemonic | Value (HEX) | Function |
| --- | --- | --- | --- |
| MOVE | MOVE MOVEI | 0 | moves value in src register to dest register |
| MOVE Multiple | MOVEM | 1 | moves a block of quadlets between the source and destination |
|  |  | 2 |  |
|  |  | 3 |  |
| AND | AND ANDI | 4 | ANDs the value in the src register to the immediate value or the value in the dest register, and stores the result into the dest register |
| OR | OR ORI | 5 | ORs the value in the src register to the immediate value or the value in the dest register, and stores the result into the dest register |
| SHIFT | SHIFT SHIFTI | 6 | SHIFTS the value in the src register by the immediate value or the value in the dest register and stores the result into the dest register; positive values cause the isochronous data pipe to shift right; the isochronous data pipe fills the input bits with zeros |

TABLE III-continued

| Name | Mnemonic | Value (HEX) | Function |
|---|---|---|---|
| COMPARE | CMP<br>CMPI | 7 | subtracts the immediate value from the value in the src register, or subtracts the value in the src register from the value in the dest register, but does not store the result; sets the Z bit according to the result of the subtraction |
| ADD | ADD<br>ADDI | 8 | Adds value in src register to the immediate value or the value in dest register and stores the result in the dest register |
| SUBTRACT | SUB<br>SUBI | 9 | Subtracts the immediate value from the value in the src register, or subtracts the value in the src register from the value in the dest register and stores the result in the dest register |
| MULTIPLY | MULT<br>MULTI | A | Multiplies the immediate value by the value in the src register, or multiples the value in the src register by the value in the dest register and stores the result in the dest register |
|  |  | B |  |
|  |  | C |  |
|  |  | D |  |
|  |  | E |  |
|  |  | F |  |
| BRANCH | BRA | 10 | Branch to the control store address contained in the imm field |
| BRANCH ON ZERO | BZ | 11 | Branch to the control store address contained in the imm field if the result of the dest field from the previous operation was equal to zero |
| BRANCH ON NOT ZERO | BNZ | 12 | Branch to the control store address contained in the imm field if the result of the dest field from the previous operation was not equal to zero |
|  |  | 13 |  |
| BRANCH TO SUB | BSR | 14 | Decrement the stack pointer, save the address of the following instruction on the stack and branch to the CS address contained in the imm field |
| BRANCH TO SUB ON ZERO | BSRZ | 15 | If the result of the dest field from the previous operation was equal to zero, then decrement the stack pointer, save the address of the following instruction on the stack and branch to the CS address contained in the immediate field |
| BRANCH TO SUB ON NOT ZERO | BSRNZ | 16 | If the result of the dest field from the previous operation was not equal to zero, then decrement the stack pointer, save the address of the following instruction on the stack and branch to the CS address contained in the imm field |
|  |  | 17 |  |
| RETURN | RET | 18 | Branch to the instruction at the address contained on the stack; increment the stack pointer |

For most of the operations listed in Table III, there are included two mnemonic instructions. The mnemonic instruction which includes an "I" specifies the operation is to be conducted using the immediate value. The mnemonic instruction which does not include an "I" specifies the operation is to be conducted between the values in the source and destination registers.

When a MOVE operation is performed, the value in the register specified in the source field src is moved to the register specified in the destination field dest. If the register specified in the source field src is a thirty-four bit register and the register specified in the destination field dest is a thirty-two bit register, the high order two bits will be lost. If the register specified in the source field src is a thirty-two bit register and the register specified in the destination field dest is a thirty-four bit register, then the high order two bits will both be set to a logical low value.

When a MOVE Multiple operation is performed, a number of quadlets of data specified by a count value are moved from the register specified in the source field src to the register specified in the destination field dest. The count value is stored in the register designated in the immediate field of the instruction. Preferably, for the MOVE Multiple operation, the register specified in the source field src is one of the data interface registers DATA_0–DATA_3, which access a DMA channel, or the bus input register BUS_IN. Preferably, for this operation, the register specified in the destination field dest is one of the data interface registers DATA_0–DATA_3, which access a DMA channel, or the bus output register BUS_OUT.

During an AND operation, a logical AND operation is performed on the values in the source field src and the destination field dest and the result is stored in the register specified in the destination field dest. The ANDI form of this instruction uses the value in the immediate field instead of the value in the destination field as one of the operands and stores the result in the register specified in the destination field dest. If the register specified in the source field src is a thirty-four bit register and the register specified in the destination field dest is a thirty-two bit register, the high order two bits will be lost. If the register specified in the source field src is a thirty-two bit register and the register specified in the destination field dest is a thirty-four bit register, then the high order two bits will both be set to a logical low value. If both the registers specified in the source field src and the register specified in the destination field dest are thirty-four bit registers, then the AND operation is performed on all thirty-four bits.

During an OR operation, a logical OR operation is performed on the values in the registers specified by the source field src and the destination field dest and the result is stored in the register specified in the destination field dest. The ORI form of this instruction uses the value in the immediate field instead of the value in the destination field as one of the operands and stores the result in the register specified in the destination field dest. If the register specified in the source field src is a thirty-four bit register and the register specified in the destination field dest is a thirty-two bit register, the high order two bits will be lost. If the register specified in the source field src is a thirty-two bit register and the register specified in the destination field dest is a thirty-four bit register, then the high order two bits will both be set to a logical low value. If both the register specified in the source field src and the register specified in the destination field dest are thirty-four bit registers, then the OR operation is performed on all thirty-four bits.

When a SHIFT operation is performed, the value in the destination register dest is shifted by the number of bits specified by the value in the source register src and the result is stored in the register specified in the destination field dest. A positive shift value shifts the value in the destination register to the right towards the least significant bit and zeros are used to fill in the shifted bits on the left beginning with the most significant bit. A negative shift value shifts the value in the destination register to the left towards the most significant bit and zeros are used to fill in the shifted bits on the right beginning with the least significant bit. The SHIFTI form of this instruction shifts the value in the source register by the number of bits specified in the immediate field and stores the result in the register specified in the destination field. If the register specified in the source field src is a thirty-four bit register and the register specified in the destination field dest is a thirty-two bit register, the high order two bits will be lost. If the register specified in the source field src is a thirty-two bit register and the register specified in the destination field dest is a thirty-four bit register, then the high order two bits will both be set to a logical low value. If both the register specified in the source field src and the register specified in the destination field dest are thirty-four bit registers, then the shift operation is performed on only the low order thirty-two bits.

When a CMP operation is performed, the value in the source register src is subtracted from the value in the destination register dest. If the result of the CMP operation is equal to zero, the Z bit is set to a logical high value. If the result of the CMP operation is not equal to zero, the Z bit is set to a logical low value. The results of the CMP operation are not stored anywhere. The CMPI form of this instruction subtracts the immediate value from the value in the source register src, and sets the Z bit as specified above, according to the result. This instruction also does not store the result of the operation.

When an ADD operation is performed, the value in the source register src is added to the value in the destination register dest and the result is stored in the destination register dest. The ADDI form of this instruction adds the value in the source register src to the immediate value and stores the result in the destination register dest. If the register specified in the source field src is a thirty-four bit register and the register specified in the destination field dest is a thirty-two bit register, the high order two bits will be lost. If the register specified in the source field src is a thirty-two bit register and the register specified in the destination field dest is a thirty-four bit register, then the high order two bits will both be set to a logical low value. If both the register specified in the source field src and the register specified in the destination field dest are thirty-four bit registers, then the ADD operation is performed on only the low order thirty-two bits.

When a SUB operation is performed, the value in the destination register dest is subtracted from the value in the source register src and the result is stored in the destination register dest. The SUBI form of this instruction subtracts the immediate value from the value in the source register and the result is stored in the destination register dest. If the register specified in the source field src is a thirty-four bit register and the register specified in the destination field dest is a thirty-two bit register, the high order two bits will be lost. If the register specified in the source field src is a thirty-two bit register and the register specified in the destination field dest is a thirty-four bit register, then the high order two bits will both be set to a logical low value. If both the register specified in the source field src and the register specified in the destination field dest are thirty-four bit registers, then the SUB operation is performed on only the low order thirty-two bits.

When a MULT operation is performed, the value in the source register src is multiplied by the value in the destination register dest and the result is stored in the destination register dest. The MULTI form of this instruction multiplies the immediate value by the value in the source register src and the result is stored in the destination register dest. If the register specified in the source field src is a thirty-four bit register and the register specified in the destination field dest is a thirty-two bit register, the high order two bits will be lost. If the register specified in the source field src is a thirty-two bit register and the register specified in the destination field dest is a thirty-four bit register, then the high order two bits will both be set to a logical low value. If both the register specified in the source field src and the register specified in the destination field dest are thirty-four bit registers, then the MULT operation is performed on only the low order thirty-two bits.

When a BRANCH operation is performed, the isochronous data pipe 42 branches to the control store address contained in the low order byte of the source field src. The source field src can specify a register or an immediate value.

When a BRANCH ON ZERO operation is performed, the isochronous data pipe 42 branches to the control store address contained in the low order byte of the source field src if the result of the last arithmetic or move control store instruction was equal to zero. The source field src can specify a register or an immediate value.

When a BRANCH ON NOT ZERO operation is performed, the isochronous data pipe 42 branches to the control store address contained in the low order byte of the source field src if the result of the last arithmetic or move control store instruction was not equal to zero. The source field can specify a register or an immediate value.

When a BSR operation is performed, the address of the next control store instruction is pushed onto the stack and the isochronous data pipe 42 branches to the control store address contained in the low order byte of the source field src. The source field src can specify a register or an immediate value.

When a BSR ON ZERO operation is performed, if the result of the last arithmetic or move control store instruction was equal to zero, the address of the next control store instruction is pushed onto the stack and the isochronous data pipe 42 branches to the control store address contained in the low order byte of the source field src. The source field src can specify a register or an immediate value.

When a BSR ON NOT ZERO operation is performed, if the result of the last arithmetic or move control store instruction was not equal to zero, the address of the next control store instruction is pushed onto the stack and the isochronous data pipe 42 branches to the control store address contained in the low order byte of the source field src. The source field src can specify a register or an immediate value.

When a RETURN operation is performed, the last control store address is popped off of the stack and the isochronous data pipe 42 branches to that address.

The isochronous data pipe 42 of the preferred embodiment is programmed by a device before it can transfer and manipulate data. Once programmed and initialized, the control register is used to change the operational state of the isochronous data pipe 42. The current operational state is completely defined by the value in the current channel mask register and the information contained in the low order byte of the status register.

In order to change the state of the isochronous data pipe 42, a new channel mask value is programmed into the pending channel mask register and a new operational state into the control register. In the same register access to the control register, the go bit is also set and an event is programmed into the event field. When the programmed event occurs, the isochronous data pipe 42 transfers the value in the pending channel mask register to the current channel mask register. The isochronous data pipe 42 also transfers the information in the low order byte of the control register into the low order byte of the status register.

In order to stop the operation of the isochronous data pipe 42, a value of all zeros is programmed into the pending channel mask register and a logical low value into the transmit enable bit in the control register. As with any state change, the go bit is also set and an event is programmed into the event field of the control register. When the event occurs the value in the current channel mask register becomes zero and the transmit enable bit in the status register is pulled to a logical low value, thereby stopping the operation of the isochronous data pipe 42. When the operation of the isochronous data pipe 42 is stopped, the active bit in the status register is also pulled to a logical low value.

In order to activate the isochronous data pipe 42, a control store program is loaded and the proper control store offsets are programmed into the control store address register file. The pending channel mask register is then programmed with a bit mask of the channels which the isochronous data pipe 42 is to receive. If the isochronous data pipe 42 is not receiving data, the value in the pending channel mask register is programmed to zero. The go bit in the control register is set to a logical high value to indicate a state change. The transmit enable bit in the control register is set to a logical high value if the isochronous data pipe 42 is to transmit isochronous data. The stop on error bit in the control register is set to a logical high value if the isochronous data pipe 42 is to stop operation on any error. If the isochronous data pipe 42 is transmitting isochronous data, the output enable bits in the control register which correspond to the DMA channels involved in transmitting isochronous data are set to a logical high value. The event field in the control register is programmed to an event on which the isochronous data pipe 42 is to change state.

In an alternate embodiment of the media storage device 44 of the present invention, the isochronous data pipe 42 includes hard-coded, fixed firmware for manipulating data packets. In this embodiment, the isochronous data pipe will only manipulate communications into particular preprogrammed formats. The isochronous data pipe within the preferred embodiment of the present invention can be programmed by the external controller 46 and configured for manipulating data packets into any desired format. In the preferred embodiment, the appropriate conversion code is downloaded from the external controller 46 to the isochronous data pipe 42.

While the external controller 46 is preferably coupled directly to the media storage device 44, it should also be apparent that the external controller 46 can alternatively be coupled to the media storage device 44 through the IEEE 1394-1995 serial bus network.

The embedded filter 42 is included within the media storage device 44 in order to take advantage of the fact that most streams of data will be written to and read from the media storage device 44. Accordingly, the data being written to and read from the media storage device 44 can be manipulated by the embedded filter 42 without disrupting its flow. Data which is not being written to or read from the media storage device can also be manipulated by the embedded filter 42 as it is being transmitted from one device to another device on the IEEE 1394-1995 serial bus structure. During data operations involving the media storage device 44, the data can be manipulated as it is being written to the media 40 or after it has been read from the media 40 and before it is transmitted on the IEEE 1394-1995 serial bus. The data can also be manipulated both as it is being written to and read from the media 40.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is used with an IEEE 1394-1995 serial bus structure, the present invention could also be implemented on any other appropriate bus structures. Additionally, it will be apparent to those skilled in the art that the register file and/or the instruction set and their details of operation as described herein can be substantially or completely altered in a specific implementation without departing from the intended spirit or scope of the present invention.

We claim:

1. A filtering device embedded within a media storage device configured for coupling to other devices for receiving and transmitting streams of data directed to a destination device, the filtering device comprising:

a. a control circuit configured to receive instructions from an external controller for converting streams of data from a first format to a second format corresponding to the destination device; and b. a manipulating circuit coupled to the control circuit for manipulating received streams of data in the first format to manipulated streams of data in the second format according to the instructions within the control circuit.

2. The filtering device as claimed in claim 1 wherein the media storage device is configured for coupling to an IEEE 1394-1995 serial bus structure.

3. The filtering device as claimed in claim 2 wherein the manipulating circuit will manipulate isochronous streams of data.

4. The filtering device as claimed in claim 2 wherein the manipulating circuit will manipulate both isochronous and asynchronous streams of data.

5. The filtering device as claimed in claim 4 wherein the instructions are programmed within firmware in the control circuit.

6. The filtering device as claimed in claim 4 wherein the instructions are stored in read-only memory in the control circuit.

7. A media storage device comprising:

a. an interface circuit for receiving a stream of data, thereby forming a received stream of data, and also for transmitting a manipulated stream of data in a format corresponding to a destination device; and b. a filtering circuit coupled to the interface circuit for manipulating the received stream of data into a predetermined format according to programmed instructions received from an external controller, thereby forming the manipulated stream of data.

8. The media storage device as claimed in claim 7 further comprising media coupled to the filtering circuit on which one of the received stream of data and the manipulated stream of data is stored.

9. The media storage device as claimed in claim 8 further comprising a read/write channel circuit coupled to the filtering circuit and to the media for controlling read and write operations from and to the media.

10. The media storage device as claimed in claim 7 wherein the filtering circuit is an isochronous data pipe comprising:

a. a control store memory, wherein the programmed instructions are stored for manipulating the received stream of data into the manipulated stream of data; and b. a manipulating circuit coupled to the control store memory for obtaining the programmed instructions, manipulating the received stream of data into the manipulated stream of data according to the programmed instructions, and providing the manipulated stream of data.

11. The media storage device as claimed in claim 10 wherein the programmed instructions are stored within the control store memory by the external controller.

12. The media storage device as claimed in claim 7 wherein the interface circuit is coupled to an IEEE 1394-1995 serial bus structure.

13. The media storage device as claimed in claim 12 wherein the filtering circuit manipulates both isochronous and asynchronous streams of data.

14. A method of writing data to a media storage device comprising:
   a. receiving a received packet of data to be written to the media storage device;
   b. manipulating the received packet of data according to programmed instructions programmed by an external controller, thereby forming a manipulated packet of data, wherein the manipulated packet of data has a different form than the received packet of data; and
   c. storing the manipulated packet of data onto a media within the media storage device.

15. The method as claimed in claim 14 wherein the received packet of data is received from an IEEE 1394-1995 serial bus structure.

16. The method as claimed in claim 15 wherein the step of manipulating is performed by an isochronous data pipe.

17. A method of reading data from a media storage device comprising:
   a. reading a previously stored packet of data from a media within the media storage device; and
   b. manipulating the previously stored packet of data according to programmed instructions programmed by an external controller thereby forming a manipulated packet of data, wherein the manipulated packet of data has a different form than the previously stored packet of data.

18. The method as claimed in claim 17 further comprising transmitting the manipulated packet of data to another device.

19. The method as claimed in claim 18 wherein transmitting includes transmitting the manipulated packet of data onto an IEEE 1394-1995 serial bus structure.

20. The filtering device as claimed in claim 1 wherein the control circuit includes a control store memory wherein the instructions are stored.

21. The filtering device as claimed in claim 20 wherein the instructions are stored at a memory address within the control store memory corresponding to a channel number for the stream of data if the stream of data is an isochronous stream of data and at a memory address corresponding to asynchronous data if the stream of data is an asynchronous stream of data.

22. The media storage device as claimed in claim 11 wherein the programmed instructions are stored at a memory address within the control store memory corresponding to a channel number for the stream of data if the stream of data is an isochronous stream of data and at a memory address corresponding to asynchronous data if the stream of data is an asynchronous stream of data.

23. The method as claimed in claim 14 further comprising determining a channel number for the received packet of data, wherein the programmed instructions are obtained from a memory address corresponding to the channel number.

24. The method as claimed in claim 14 wherein the programmed instructions are stored at a memory address corresponding to a channel number for the received packet of data if the received packet of data is an isochronous packet of data and at a memory address corresponding to asynchronous data if the received packet of data is an asynchronous packet of data.

25. The method as claimed in claim 17 further comprising determining a channel number for the previously stored packet of data, wherein the programmed instructions are obtained from a memory address corresponding to the channel number.

26. The method as claimed in claim 17 wherein the programmed instructions are stored at a memory address corresponding to a channel number for the previously stored packet of data if the previously stored packet of data is an isochronous packet of data and at a memory address corresponding to asynchronous data if the previously stored packet of data is an asynchronous packet of data.

* * * * *

UNITED STATES PATENT AND TRADEMARK OFFICE
CERTIFICATE OF CORRECTION

PATENT NO. : 6,292,844 B1
DATED : September 18, 2001
INVENTOR(S) : Smyers et al.

It is certified that error appears in the above-identified patent and that said Letters Patent is hereby corrected as shown below:

Title page,
Item [56], References Cited, U.S. PATENT DOCUMENTS, the following references need to be added:

| | | | |
|---|---|---|---|
| -- 3,836,722 | 09/17/74 | Muller et al. | 179/15 BS |
| 3,906,484 | 9/16/75 | Melvin, Jr. et al. | 340/347 DD |
| 4,218,756 | 08/19/80 | Fraser | 364/900 |
| 4,409,656 | 10/11/83 | Andersen et al. | 364/200 |
| 4,897,783 | 01/30/90 | Nay | 364/200 |
| 5,007,013 | 4/9/91 | Elms | 364/900 |
| 5,008,879 | 4/16/91 | Fischer et al. | 370/85.2 |
| 5,191,418 | 3/2/93 | Tran | 358/142 |
| 5,208,807 | 5/4/93 | Gass et al. | 370/60.1 |
| 5,287,478 | 2/15/94 | Johnston et al. | 395/425 |
| 5,331,320 | 7/19/94 | Cideciyan et al. | 341/56 |
| 5,361,261 | 11/1/94 | Edem et al. | 370/85.3 |
| 5,402,419 | 3/28/95 | Osakabe et al. | 370/85.1 |
| 5,412,698 | 5/2/95 | Van Brunt et al. | 375/373 |
| 5,465,402 | 11/07/95 | Ono et al. | 455/161.2 |
| 5,493,570 | 2/20/96 | Hillman et al. | 370/105.3 |
| 5,499,344 | 3/12/96 | Elnashar et al. | 395/250 |
| 5,519,701 | 5/21/96 | Colmant et al. | 370/60.1 |
| 5,524,213 | 6/4/96 | Dais et al. | 395/200.170 |
| 5,526,353 | 6/11/96 | Henley et al. | 370/60.1 |
| 5,533,018 | 7/2/96 | DeJager et al. | 370/60.1 |
| 5,535,208 | 07/09/96 | Kawakami et al. | 370/84 |
| 5,537,408 | 7/16/96 | Branstad et al. | 370/79 |
| 5,561,427 | 10/1/96 | Coleman, Jr. | 341/161 |
| 5,566,174 | 10/15/96 | Sato et al. | 370/84 |
| 5,594,732 | 1/14/97 | Bell et al. | 370/401 |
| 5,619,646 | 4/8/97 | Hoch et al. | 395/200.01 |
| 5,632,016 | 5/20/97 | Hoch et al. | 395/200.02 |
| 5,640,286 | 6/17/97 | Acosta et al. | 360/48 |
| 5,646,941 | 7/8/97 | Nishimura et al. | 370/389 |
| 5,655,138 | 8/5/97 | Kikinis | 395/808 |
| 5,668,948 | 9/16/97 | Belknap et al. | 395/200.61 |
| 5,684,954 | 11/4/97 | Kaiserswerth et al. | 395/200.2 |
| 5,687,316 | 11/11/97 | Graziano et al. | 395/200.2 |
| 5,696,924 | 12/9/97 | Robertson et al. | 395/412 |
| 5,706,439 | 1/6/98 | Parker | 395/200.17 |
| 5,708,779 | 1/13/98 | Graziano et al. | 395/200.8 |
| 5,710,773 | 1/20/98 | Shiga | 370/512 |
| 5,752,076 | 5/12/98 | Munson | 395/825 |
| 5,758,075 | 5/26/98 | Graziano et al. | 395/200.8 -- |

UNITED STATES PATENT AND TRADEMARK OFFICE
CERTIFICATE OF CORRECTION

PATENT NO. : 6,292,844 B1
DATED : September 18, 2001
INVENTOR(S) : Smyers et al.

It is certified that error appears in the above-identified patent and that said Letters Patent is hereby corrected as shown below:

U.S. PATENT DOCUMENTS (cont'd), the following references need to be added:

| | | | |
|---|---|---|---|
| -- 5,761,457 | 6/2/98 | Gulick | 395/308 |
| 5,774,683 | 6/30/98 | Gulick | 395/309 |
| 5,787,256 | 7/28/98 | Marik et al. | 395/200.68 |
| 5,793,953 | 8/11/98 | Yeung et al. | 395/200.8 |
| 5,815,678 | 9/29/98 | Hoffman et al. | 395/309 |
| 5,828,416 | 10/27/98 | Ryan | 348/512 |
| 5,828,903 | 10/27/98 | Sethuram et al. | 395/817 |
| 5,835,793 | 11/10/98 | Li et al. | 395/898 |
| 5,848,253 | 12/8/98 | Walsh et al. | 395/309 |
| 5,938,752 | 8/17/99 | Leung et al. | 710/126 --. |

FOREIGN PATENT DOCUMENTS, the following references need to be added:

| | | | | |
|---|---|---|---|---|
| -- WO 98/02881 | 1/1998 | PCT | G11B | 20/10 |
| WO 97/33230 | 9/1997 | PCT | G06F | 13/12 |
| WO 98/47271 | 10/1998 | PCT | H04L | 29/06 |
| 0 383 437 A2 | 2/1989 | EP | H04J | 3/16 |
| 0 535 434 A2 | 4-1993 | EP | H04S | 1/00 |
| 0 703 713 A2 | 3/1996 | EP | H04N | 7/58 |
| 0 860 823 A1 | 8/1998 | EP | G11B | 20/10 |
| TW 328997 | 4-1998 | TW | G06F | 13/38 --. |

OTHER PUBLICATIONS, the following references need to be added:
-- WPI/Derwent Patent Application Abstract, XP 002105723, dated 4/1/98, (English abstract of TW 328997).
"1394 High Performance Serial Bus: The Digital Interface for ATV," Kunzman, et al., IEEE Transactions on consumer electronics, 41, No. 3, (August 1995) pp 893 - 900.
"IEEE 1394: A Ubiquitous Bus," Hoffman, et al., Digest of Papers of the Computer Society, Computer Conference (COMPCON), Technologies for the Information Superhighway, 3/5/99. pp 334 - 338.
"1394 200 Mb/s PHYsical Layer Transceiver," IBM Microelectronics, Product Data Sheet and Application Notes, Version 1.4, March 14, 1996.
"IEEE 1394-1995 Triple Cable Transceiver/ Arbiter," Texas Instruments TSB21LV03, Product Preview, Revision 0.99, March 19, 1996.
"The IEEE-1394 HIGH SPEED SERIAL BUS," R.H.J. Bloks, Phillips Journal of Research, Vol. 50, pages 209-216, July 1996. --

UNITED STATES PATENT AND TRADEMARK OFFICE
CERTIFICATE OF CORRECTION

PATENT NO.    : 6,292,844 B1
DATED         : September 18, 2001
INVENTOR(S)   : Smyers et al.

It is certified that error appears in the above-identified patent and that said Letters Patent is hereby corrected as shown below:

OTHER PUBLICATIONS (cont'd), the following reference needs to be added:
-- "IEEE 1394, The Cable Connection to Complete the Digital Revolution," Daniel Moore. --

Signed and Sealed this

Twenty-fourth Day of February, 2004

JON W. DUDAS
*Acting Director of the United States Patent and Trademark Office*